US006767043B1

(12) United States Patent
Sanseviero

(10) Patent No.: US 6,767,043 B1
(45) Date of Patent: Jul. 27, 2004

(54) COVER FOR PICK-UP BED

(76) Inventor: Nicolas Sanseviero, 1112 Weston Rd., No. 229, Weston, FL (US) 33326

( * ) Notice: Subject to any disclaimer, the term of this patent is extended or adjusted under 35 U.S.C. 154(b) by 0 days.

(21) Appl. No.: 10/389,318

(22) Filed: Mar. 17, 2003

(51) Int. Cl.$^7$ .................................................. B60J 7/04
(52) U.S. Cl. .................. 296/100.03; 296/201; 296/219
(58) Field of Search ................... 296/100.01, 100.03, 296/100.09, 100.11, 100.12, 102, 146.16, 164, 201, 219

(56) References Cited

U.S. PATENT DOCUMENTS

| | | | | |
|---|---|---|---|---|
| 973,502 | A | * 10/1910 | Harriman et al. | 49/163 |
| 2,086,091 | A | * 7/1937 | Payette | 296/100.09 |
| D141,085 | S | * 5/1945 | Powers | D12/96 |
| 2,861,836 | A | * 11/1958 | Goeggel | 296/219 |
| 2,992,040 | A | * 7/1961 | Carlsson et al. | 296/100.12 |
| 3,416,835 | A | * 12/1968 | Ohle | 296/100.09 |
| 3,472,548 | A | * 10/1969 | Comisac | 296/183.2 |
| 3,977,720 | A | * 8/1976 | Schreiberg | 296/185.1 |
| 3,986,749 | A | * 10/1976 | Hull et al. | 296/100.09 |
| 4,184,709 | A | * 1/1980 | Kim | 296/219 |
| 4,210,361 | A | * 7/1980 | Marvin et al. | 296/210 |
| 4,630,858 | A | * 12/1986 | Bez | 296/146.8 |
| 4,861,092 | A | * 8/1989 | Bogard | 296/100.09 |
| 6,299,243 | B1 | * 10/2001 | Gerald, Sr. | 296/210 |
| 6,428,079 | B1 | * 8/2002 | Van Dyke | 296/100.06 |
| 6,478,368 | B1 | * 11/2002 | de Gaillard | 296/216.02 |
| 6,505,878 | B1 | * 1/2003 | Mascolo | 296/100.04 |
| 6,588,819 | B1 | * 7/2003 | Block | 296/26.04 |

FOREIGN PATENT DOCUMENTS

EP                 298 678 A2 * 1/1989 ................ 296/96.2

* cited by examiner

Primary Examiner—D. Glenn Dayoan
Assistant Examiner—Paul A. Chenevert
(74) Attorney, Agent, or Firm—Albert Bordas; Jesus Sanchelima

(57) ABSTRACT

A pick-up truck bed cover having a cover frame assembly that is secured thereon to cover the truck bed. The cover frame assembly is generally rectangularly shaped to fit over typical truck beds and has a track system for a shutter assembly. The shutter assembly is slidably mounted within the track system and has means to retract and extract. In the retracted position, the truck bed is nearly completely exposed and in the extracted position, the truck bed is covered. Positioned approximately perpendicularly to the shutter assembly, is a door assembly that is mounted at one end of the cover frame assembly for access to the truck bed.

2 Claims, 6 Drawing Sheets

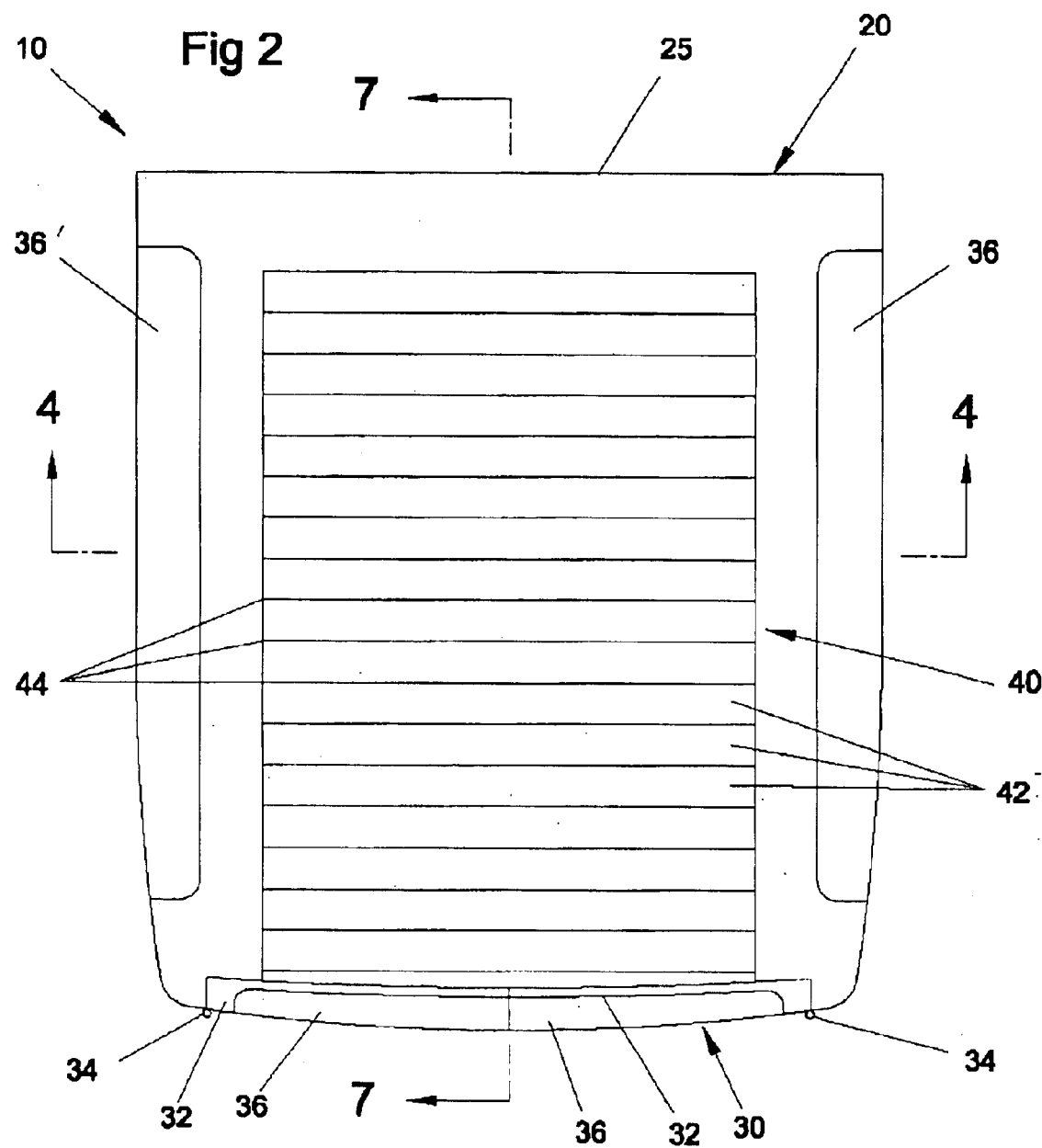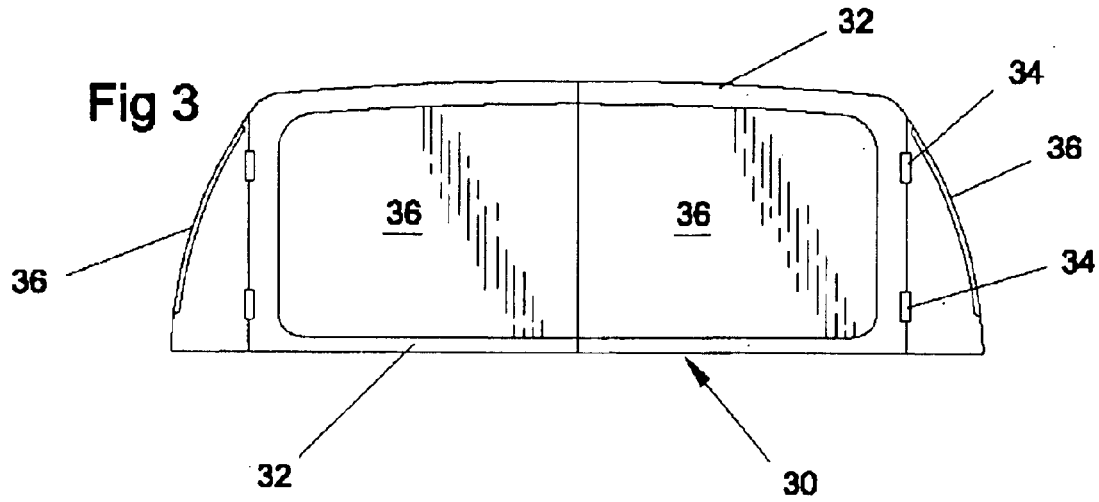

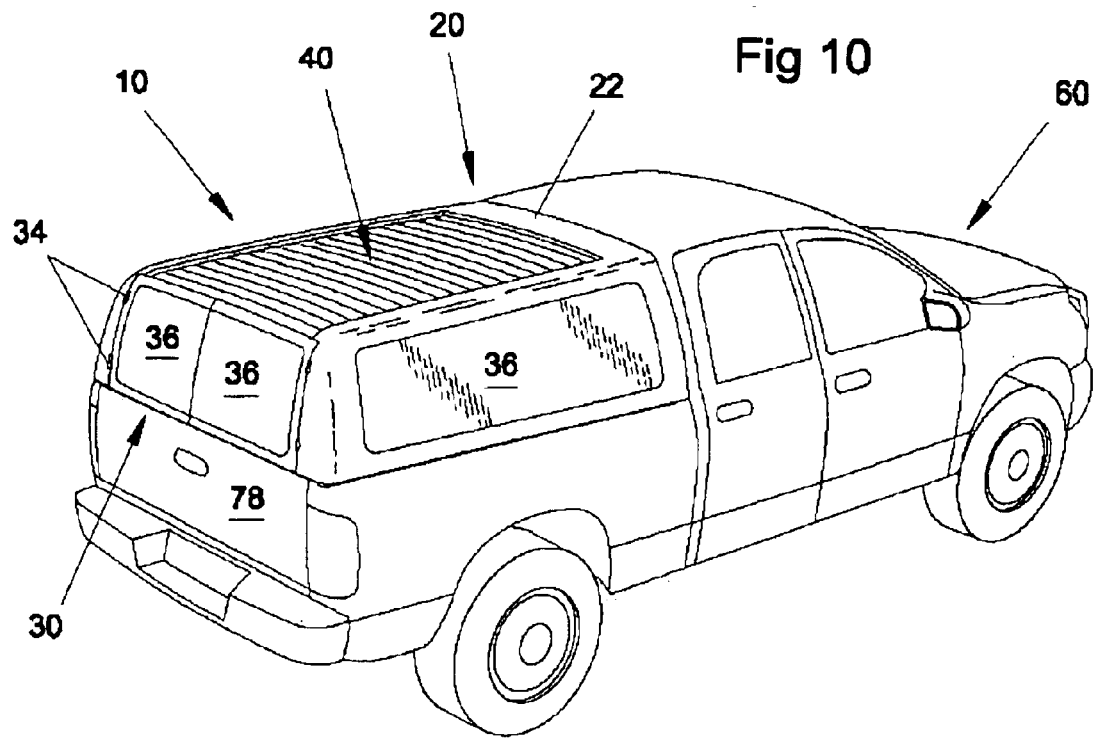
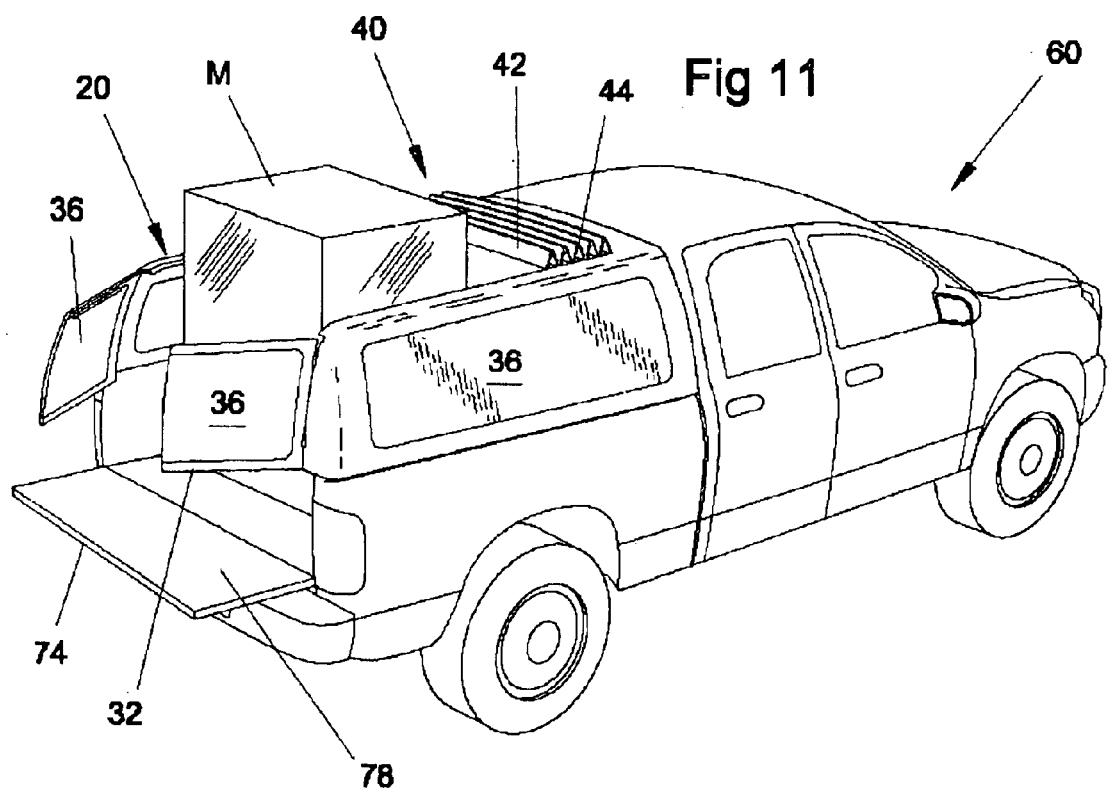

COVER FOR PICK-UP BED

BACKGROUND OF THE INVENTION

1. Field of the Invention

The present invention relates to accessories for vehicles, and more particularly, to covers for pick-up truck beds.

2. Description of the Related Art

To protect valuables in a pick-up truck, it is often necessary to store them on the pick-up bed of the truck. Typically, it is most desirable to have a pick-up truck bed cover to protect the valuables from theft, and elements such as rain, sleet, snow, hail, wind, and other common weather related circumstances.

Many designs for pick-up truck bed covers have been designed in the past. However, most of them have supporting frame structures that obstruct the loading of matter onto the pick-up truck bed. Such matter could be a piano for instance. A pick-up truck having a bed cover as is known in the art, does not allow the loading of the piano, or any other matter having a greater height than the bed cover, such as, but not limited to refrigerators, big-screen televisions, furniture, ladders, construction material and construction equipment. In order to transport the piano or other large matter, a user would have to remove the bed cover, thus allowing sufficient room for the height of the matter.

There are no pick-up truck bed covers to the best of applicant's knowledge that include a cover frame assembly having a door assembly and shutter assembly that enables unobstructed loading of matter onto the pick-up truck bed, while the shutter assembly is in a retracted position. The instant invention can also protect valuables loaded on the pick-up truck bed while the shutter assembly is in an extracted position.

SUMMARY OF THE INVENTION

A pick-up truck bed cover having a cover frame assembly that is secured thereon to cover the pick-up truck bed. The cover frame assembly is generally rectangularly shaped to fit over typical truck beds and has a track system for the shutter assembly. The shutter assembly is slidably mounted within the track system and has means to retract and extract. In the retracted position, the truck bed is nearly completely exposed and in the extracted position, the truck bed is covered. Positioned approximately perpendicularly to the shutter assembly, is a door assembly that is mounted at one end of the cover frame assembly for access to the truck bed.

More specifically, a cover for a pick-up truck bed comprising a cover frame assembly having first and second ends and first, second, and third walls. The first and second walls are parallel and spaced apart from each other. The third wall is mounted perpendicularly to the first and second walls at the first end.

A door assembly is perpendicularly mounted between the first and second walls at the second end. A shutter assembly is mounted to the cover frame assembly with first means to place the shutter assembly in a first open position and second means to place the shutter assembly in a closed position.

Even more specifically, the instant invention is a cover for a pick-up truck bed comprising a cover frame assembly having first and second ends and first, second, and third walls. The first and second walls are parallel and spaced apart from each other. The first and second walls each have a track assembly extending a first predetermined distance from the first end towards the second end. The third wall is mounted perpendicular to the first and second walls at the first end.

A door assembly is perpendicularly mounted between the first and second walls at the second end. A shutter assembly is slidably mounted within the track assembly with retracting means to place the shutter assembly in a first open position and extracting means to place the shutter assembly in a closed position. The door assembly has at least one door frame hingedly mounted to the cover frame assembly at the second end.

Matter may be loaded onto the pick-up truck bed without obstruction from the cover frame assembly or the door assembly when the shutter assembly is in the first open position and the at least one door frame is in a second open position.

The retracting and extracting means include wheels extending from the shutter assembly that are slidably mounted within the track assembly.

The at least one door frame has a first window hingedly secured thereon, having first latching means to maintain a third open position. The first latching means includes a first latch to maintain the first window in the third open position.

The first and second walls have second and third windows respectfully and hingedly secured thereon, and have second latching means to maintain a fourth open position. The second latching means includes second and third latches to maintain the second and third windows respectfully in the fourth open position.

It is therefore one of the main objects of the present invention to provide a pick-up truck bed cover that is mounted and secured onto a pick1-up truck bed.

It is another object of this invention to provide a pick-up truck bed cover that enables unobstructed loading of matter onto the pick-up truck bed while the shutter assembly is in a retracted position.

It is still another object of the present invention to provide a pick-up truck bed cover that protects valuables from theft while the shutter assembly is in an extracted position and locked.

It is still another object of the present invention to provide a pick-up truck bed cover that protects valuables from weather related elements while the shutter assembly is in an extracted position.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 shows a top view of the instant invention.

FIG. 3 illustrates a rear view of the instant invention with door assembly 30 in a closed position.

FIG. 10 represents a perspective view of the instant invention mounted and secured onto the typical pick-up truck with shutter assembly 40 in the extracted position.

FIG. 11 represents a perspective view of the instant invention mounted and secured onto the typical pick-up truck having matter M loaded thereon with shutter assembly 40 in the retracted position and door assembly 30 in the open position.

DETAILED DESCRIPTION OF THE PREFERRED EMBODIMENT

Figure 1:
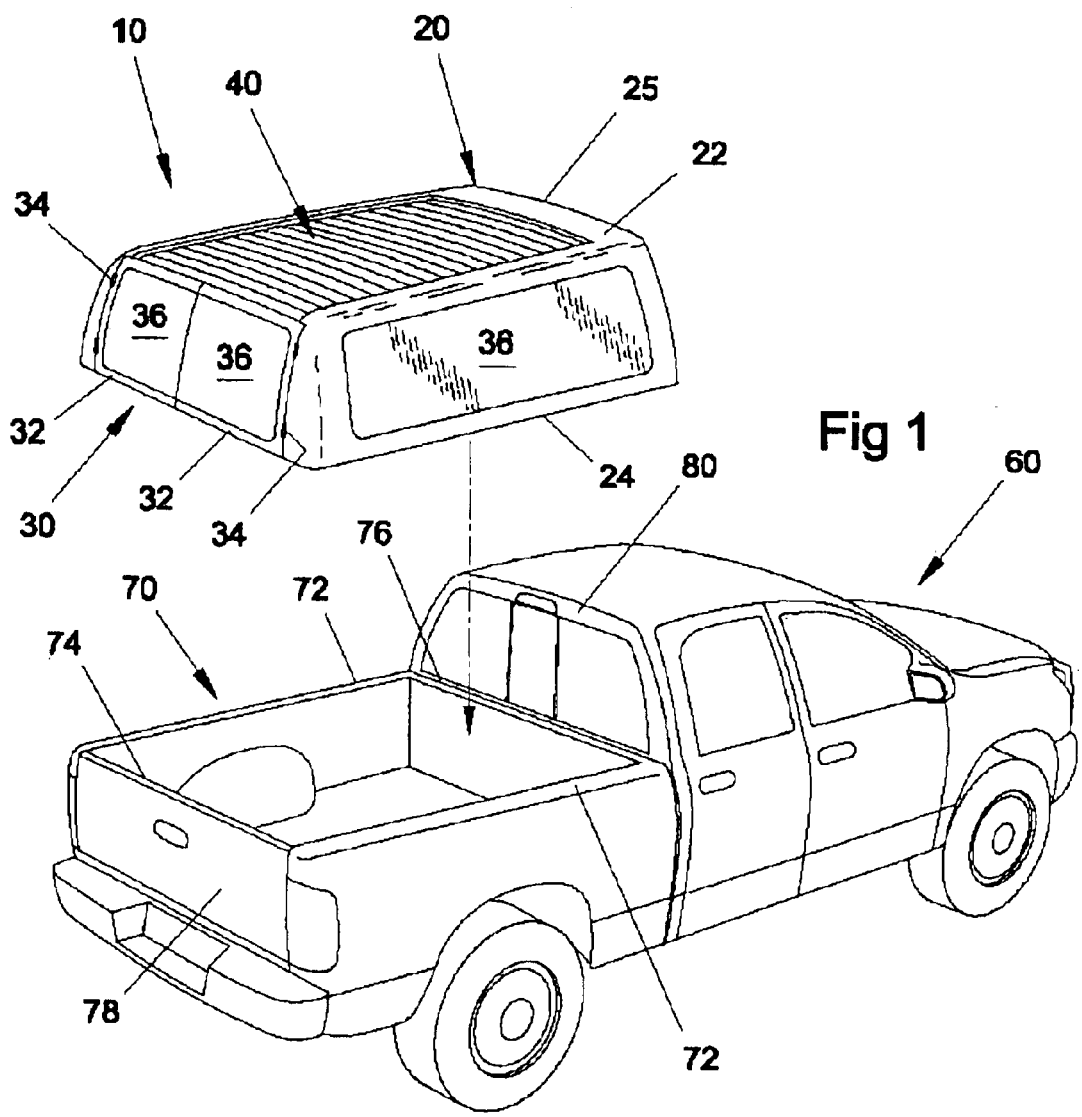
FIG. 1 represents a perspective view of the instant invention and a typical pick-up truck.

Referring now to the drawings, where the present invention is generally referred to with numeral 10, it can be observed that it basically includes cover frame assembly 20, door assembly 30, and shutter assembly 40.

As seen in FIG. 1, the instant invention is a cover assembly that may be mounted and secured onto a vehicle, such as truck 60. Instant invention 10 has cover frame assembly 20, which comprises frame 22. Frame 22 is shaped to complement the shape of bed assembly 70. Shutter assembly 40 is slidably mounted within track 26, seen in FIG. 12, and has means to retract and extract. At one end of frame 22 is door assembly 30. Door assembly 30 comprises frames 32 mounted onto hinges 34. Adjustably fixed onto frames 32 are windows 36. It is noted that hinges 34 are secured onto frame 22 in a vertical manner, thus allowing frames 32 to swing upon hinges 34. In an alternate embodiment, frames 32 are removable from hinges 34 with a quick release system. Such a quick release system may include lifting frames 32 off of hinges 34. Cover frame assembly 20 further comprises edge 24 that extends from frames 32 to wall 25. In the preferred embodiment, frame 22 has windows 36'.

In the preferred embodiment, vehicle 60 is a pick-up truck having a bed assembly such as bed assembly 70. Bed assembly 70 has edges 72 generally parallel and equally spaced apart from each other by edge 76 and edge 74 of door 78. Vehicle 60 also has wall 80, which is shaped to have wall 25 adjacent to it when instant invention 10 is mounted upon bed assembly 70. It is noted that there are many ways to secure instant invention 10 onto bed assembly 70. In the preferred embodiment, C-clamps, not seen, may be utilized to secure edges 24 to edges 72, and the edge of wall 25 to edge 76.

As seen in FIG. 2, shutter assembly 40 has a plurality of shutters 42, connected to one another by hinges 44. As illustrated, shutter assembly 40 is in the extracted position. To obtain the retracted position, seen in FIG. 12, shutter assembly 40 is manually pushed from the end at door assembly 30, towards the direction of wall 25. In alternate embodiments, shutter assembly 40 may retract and extract electronically or hydraulically with a switch assembly. As best seen in this illustration, cover frame assembly 20 is a single embodiment and in the preferred embodiment is made of a durable weather resistant metal alloy or plastic composition.

Seen in FIG. 3 is door assembly 30 in a closed position. The vertical placement of hinges 34 allows frames 32 to open outwardly with relation to cover frame assembly 20.

Figure 4:
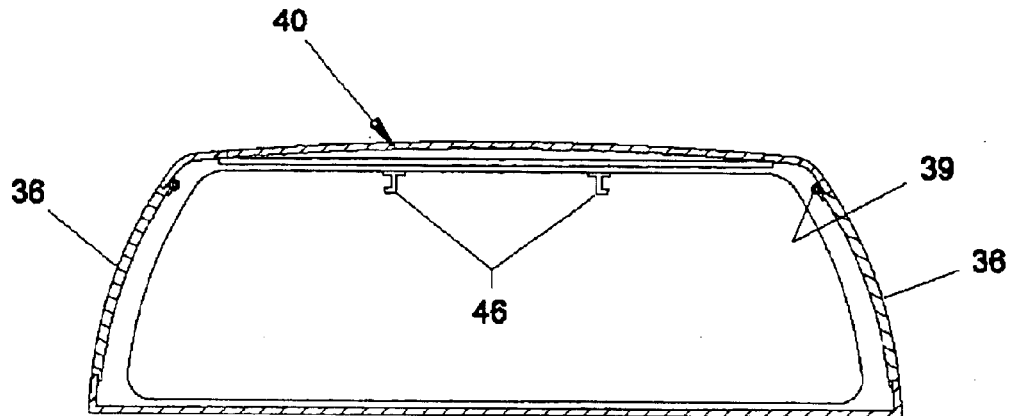
FIG. 4 is a cut view of the instant invention taken along the line 4—4 as seen in FIG. 2, with windows 36' in a closed position.

Seen in FIG. 4 is a cut view of instant invention 10 with windows 36' in a closed position.

Figure 5:
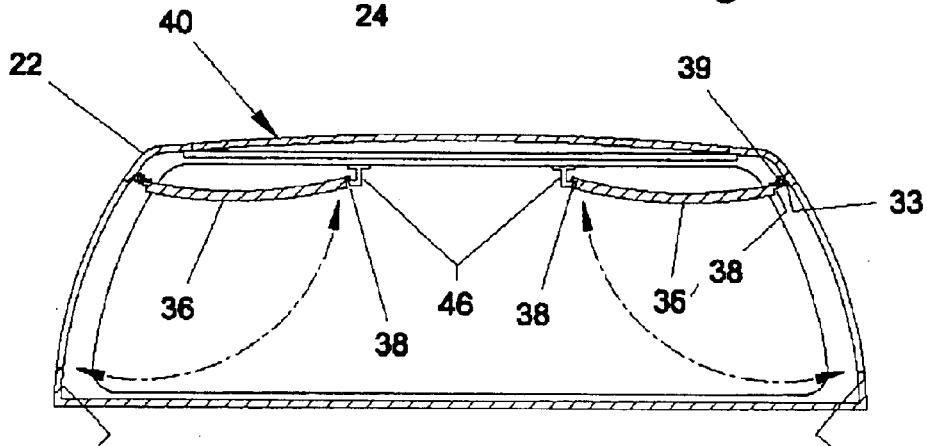
FIG. 5 is a cut view of the instant invention as seen in FIG. 4 with windows 36' in an open position.

As seen in FIG. 5, windows 36' are in an open position. Each window 36' comprises notches 38 at one end. Frame 22 has an interior side defined as wall 33. Wall 33 is shaped to fill notch 38 when window 36' is in the closed position, as seen in FIG. 4. Similarly, wall 33' is shaped to fill notch 38' when window 36' is in the closed position, as seen in FIG. 4. Mounted onto wall 33 is hinge 39, which is affixed onto window 36'. Hinge 39 allows window 36' to swing inwardly and lock upon latch 46.

Figure 6:
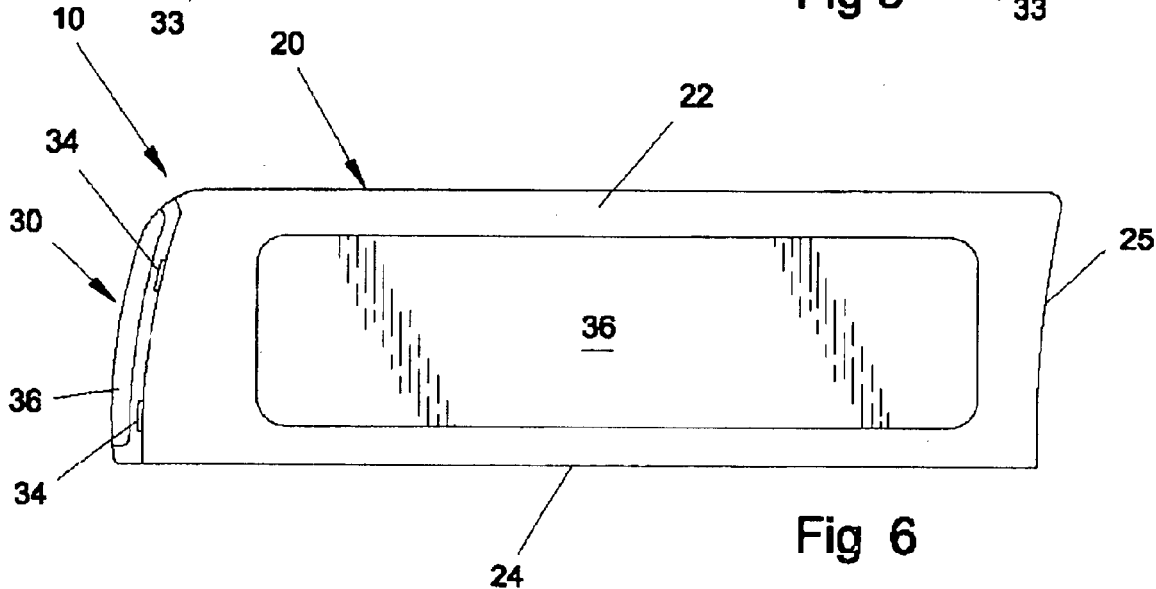
FIG. 6 is a side view of the instant invention.

As seen in FIG. 6, window 36' extends along the length of frame 22 in the preferred embodiment. In addition, wall 25 may have a variety of shapes, so long as it does not interfere with wall 80 of vehicle 60, seen in FIG. 1.

Figure 7:
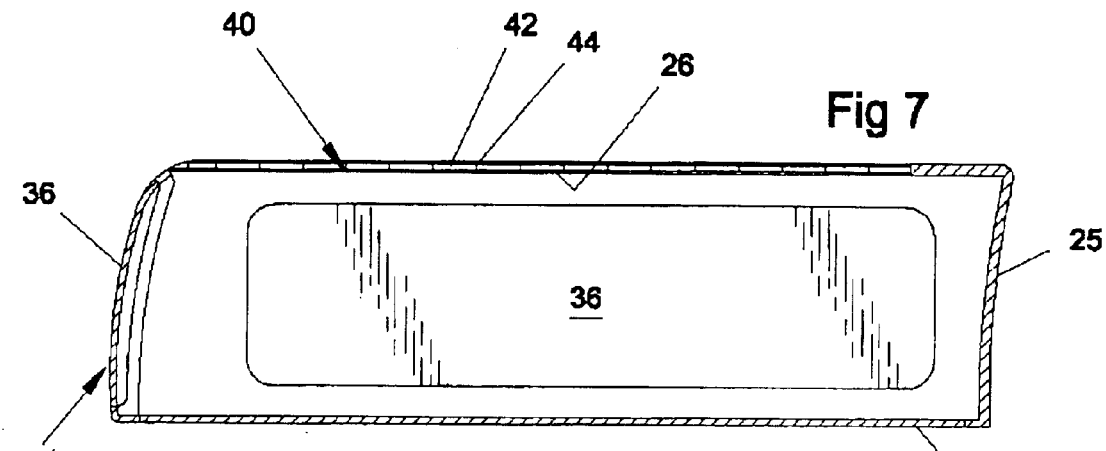
FIG. 7 is a cut view of the instant invention taken along the line 7—7 as seen in FIG. 2, with shutter assembly 40 in the extracted position.

As seen in FIG. 7, shutter assembly 40 is in the extracted position and comprises shutters 42 and hinges 44.

Figure 8:
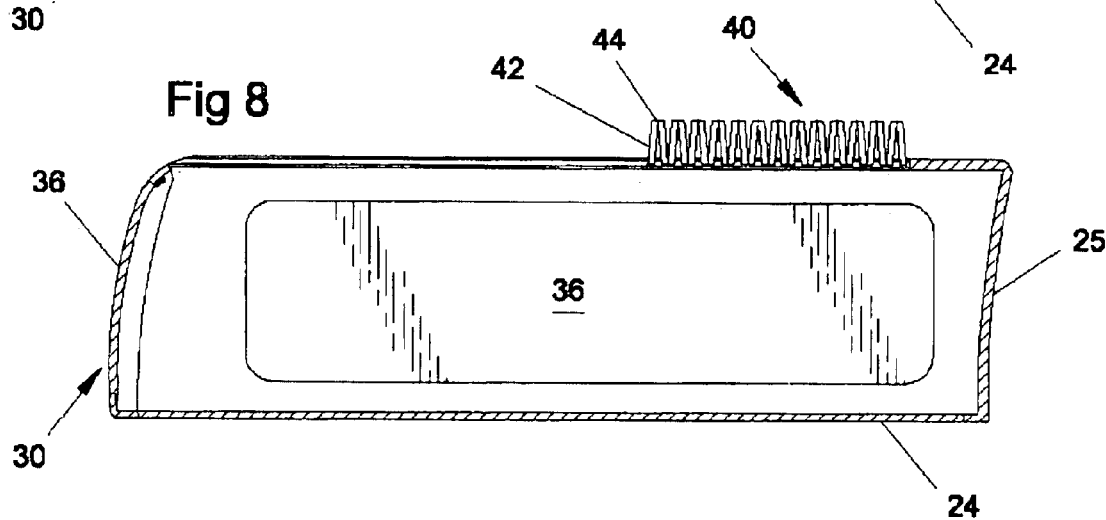
FIG. 8 is a cut view of the instant invention as seen in FIG. 7 with shutter assembly 40 in the retracted position.

As seen in FIG. 8, shutter assembly 40 is in the retracted position. To obtain this position, the shutter adjacent to door assembly 30 is forced in the direction of wall 25. In the preferred embodiment, shutter assembly 40 is an accordion-type shutter system as illustrated. However, an alternate embodiment for a shutter assembly 40 includes a coil-type system, whereby as shutter assembly 40 assumes the extracted position, it spirals into a coil adjacent to wall 25. Yet another alternate embodiment may include a plurality of covers/panels that interlock with one another to cover the area covered by shutter assembly 40, as seen in FIG. 10. To remove the plurality of covers, the user has to remove the covers/panels and store them for safekeeping.

Figure 8A:
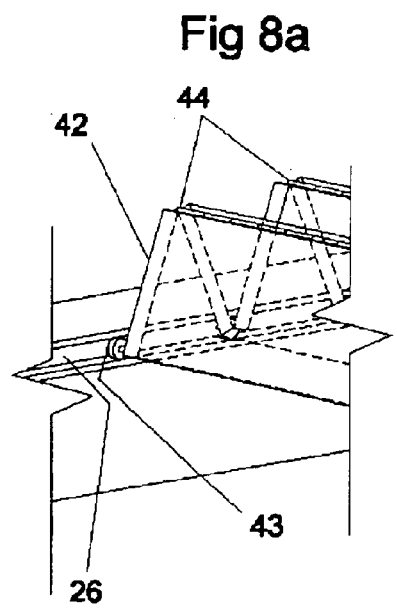
FIG. 8a is an isometric cut view of shutter assembly 40 in the retracted position.

As best seen in FIG. 8a, shutter assembly 40 has a plurality of shutters 42, connected to one another by hinges 44. Secured onto shutters 42 are wheels 43. Wheels 43 are slidably mounted within track 26 to allow shutter assembly 40 to extract and retract.

Figure 9:
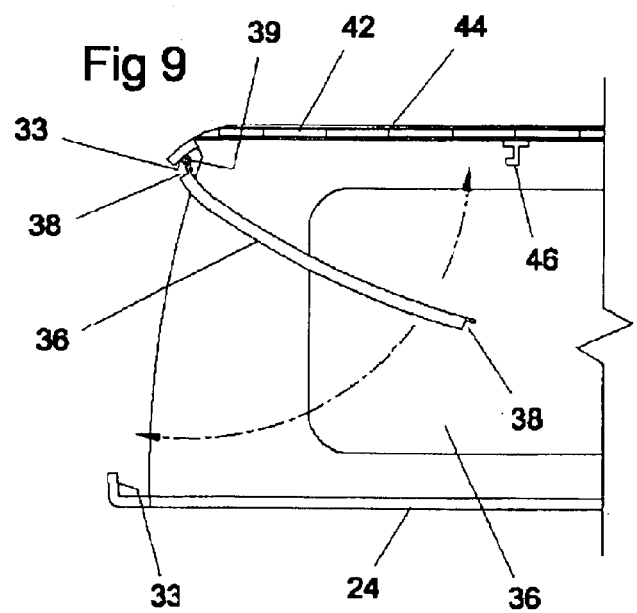
FIG. 9 is a cut view of the instant invention as seen in FIG. 7 with window 36 in an open position.

As seen in FIG. 9, window 36 is in an open position. Each window 36 comprises notch 38 at an end. Frame 22 has an interior side defined as wall 33. Wall 33 is shaped to fill notch 38 when window 36 is in the closed position, as seen in FIG. 10. Similarly, wall 331 is shaped to fill notch 38' when window 36 is in the closed position. Mounted onto wall 33 is hinge 39, which is affixed onto window 36. Hinge 39 allows window 36 to swing inwardly and lock upon latch 46.

As seen in FIG. 10, instant invention 10 is mounted upon vehicle 60 and has shutter assembly 40 in the extracted position.

As seen in FIG. 11, large matter, such as the illustrated box M may be loaded onto vehicle 60 without obstruction from cover frame assembly 20, since shutter assembly 40 is in the retracted position and frames 32 of door assembly 30 are also open.

Figure 12:
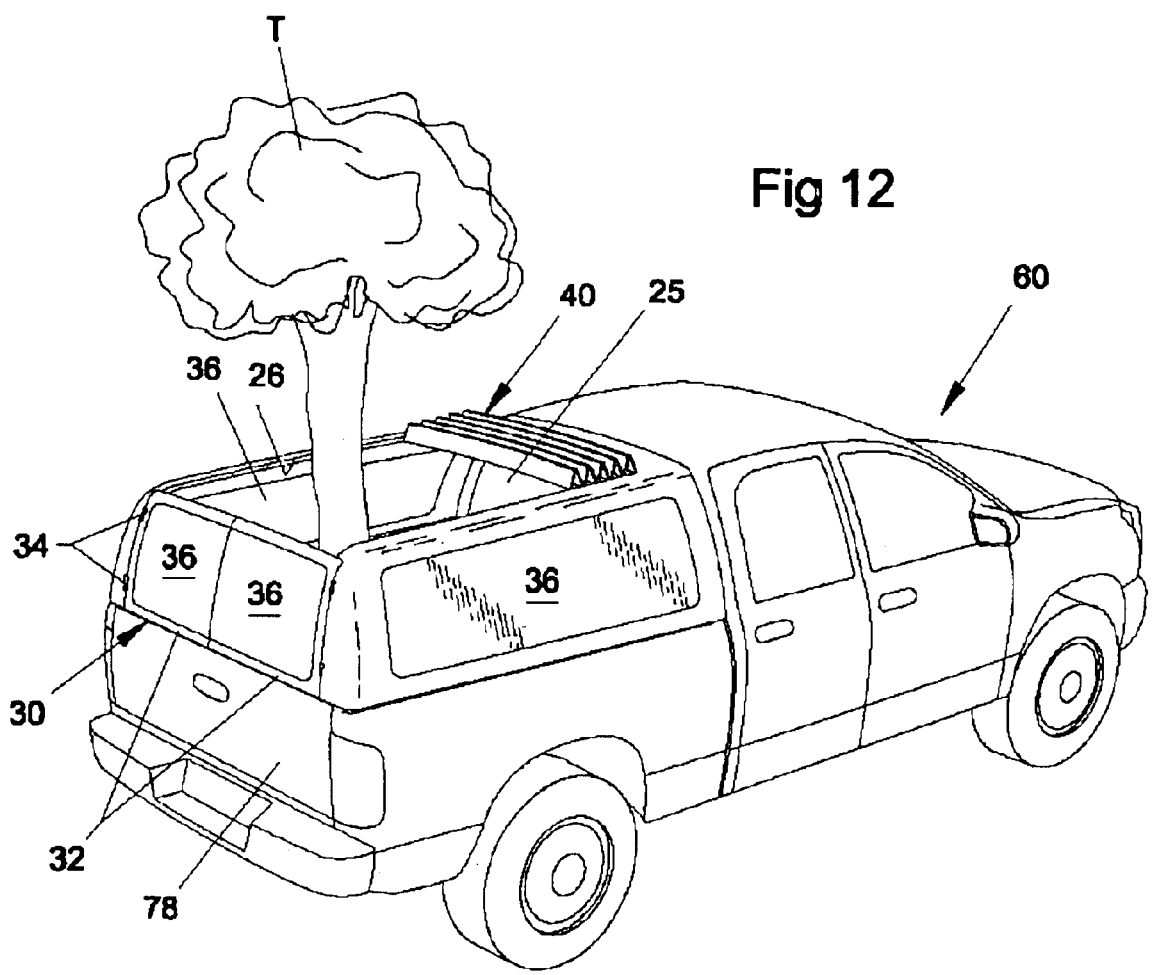
FIG. 12 represents a perspective view of the instant invention mounted and secured onto the typical pick-up truck having tree T loaded thereon for transportation with shutter assembly 40 in the retracted position and door assembly 30 in the closed position.

As seen in FIG. 12, transportation of large matter, such as the illustrated tree T may be performed without having to remove instant invention 10 from vehicle 60, since shutter assembly 40 is in the retracted position.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cover for a pick-up truck bed comprising:

A) a cover frame assembly having first and second ends and first, second, and third walls, said first and second walls parallel and spaced apart from each other, said first and second walls each having a track assembly extending a first predetermined distance from said first end towards said second end, said third wall mounted perpendicular to said first and second walls at said first end;

B) a door assembly perpendicularly mounted between said first and second walls at said second end, said door assembly has at least one door frame hingedly mounted to said cover frame assembly at said second end, said at least one door frame has a first window hingedly secured thereon having first latching means to maintain a third open position, said first latching means including a first latch to maintain said first window in said third open position; and C) a shutter assembly slidably mounted within said track assembly with retracting means to place said shutter assembly in a first open position and extracting means to place said shutter assembly in a closed position, said retracting and extracting means include wheels extending from said shutter assembly that are slidably mounted within said track assembly, further characterized in that matter may be loaded onto said pick-up truck bed without obstruction from said cover frame assembly or said door assembly when said shutter assembly is in said first open position and said at least one door frame is in a second open position.

2. The cover for a pick-up truck bed set forth in claim 1, further characterized in that said first and second walls have second and third windows respectfully and hingedly secured thereon and having second latching means to maintain a fourth open position, said second latching means including second and third latches to maintain said second and third windows respectfully in said fourth open position.

* * * * *